United States Patent
Sekioka et al.

(10) Patent No.: US 11,028,212 B2
(45) Date of Patent: Jun. 8, 2021

(54) CHLOROPRENE GRAFT COPOLYMER LATEX, METHOD FOR PRODUCING SAME, BONDING AGENT AND ADHESIVE

(71) Applicant: SHOWA DENKO K.K., Tokyo (JP)

(72) Inventors: Naoki Sekioka, Tokyo (JP); Yuya Ohguma, Tokyo (JP); Masanao Kamijo, Tokyo (JP); Yoichiro Takenoshita, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 62 days.

(21) Appl. No.: 16/324,204

(22) PCT Filed: Aug. 1, 2017

(86) PCT No.: PCT/JP2017/027847
§ 371 (c)(1),
(2) Date: Feb. 8, 2019

(87) PCT Pub. No.: WO2018/030210
PCT Pub. Date: Feb. 15, 2018

(65) Prior Publication Data
US 2019/0169344 A1 Jun. 6, 2019

(30) Foreign Application Priority Data

Aug. 10, 2016 (JP) .............................. JP2016-157627

(51) Int. Cl.
*C08F 279/02* (2006.01)
*C08L 51/04* (2006.01)
*C09J 151/04* (2006.01)
*C09J 111/02* (2006.01)

(52) U.S. Cl.
CPC ............ *C08F 279/02* (2013.01); *C08L 51/04* (2013.01); *C09J 111/02* (2013.01); *C09J 151/04* (2013.01)

(58) Field of Classification Search
None
See application file for complete search history.

(56) References Cited

U.S. PATENT DOCUMENTS

| | | | |
|---|---|---|---|
| 3,328,488 A * | 6/1967 | Delacretaz et al. | |
| 3,714,295 A * | 1/1973 | Nakayama | |
| 3,728,316 A | 4/1973 | Simons | |
| 3,975,461 A * | 8/1976 | Yamawaki etal. | |
| 4,897,462 A * | 1/1990 | Yusa | C08F 6/22 523/352 |
| 5,362,814 A * | 11/1994 | Machida | C08F 290/044 524/504 |
| 5,399,625 A | 3/1995 | Glenn, Sr. | |
| 5,773,544 A * | 6/1998 | Christell | C08F 136/18 526/223 |
| 2016/0017130 A1* | 1/2016 | Yashima | C08F 36/18 524/710 |

FOREIGN PATENT DOCUMENTS

| | | | | |
|---|---|---|---|---|
| CN | 1137277 A | | 12/1996 | |
| CN | 1582315 A | * | 2/2005 | ............... C08K 3/34 |
| GB | 1315534 A | * | 5/1973 | ............ C08F 279/02 |
| JP | 49-43277 B1 | | 11/1974 | |
| JP | 61-1 81 880 A | | 8/1986 | |
| JP | 61-243814 A | | 10/1986 | |
| JP | 61-275315 A | | 12/1986 | |
| JP | 61-275316 A | | 12/1986 | |
| JP | 1-121379 A | | 5/1989 | |
| JP | 1-123882 A | | 5/1989 | |
| JP | 1-284544 A | | 11/1989 | |
| JP | 2-265910 A | | 10/1990 | |
| JP | 2-286771 A | | 11/1990 | |
| JP | 5-86347 A | | 4/1993 | |
| JP | 9-506133 A | | 6/1997 | |
| JP | 2000-7833 A | | 1/2000 | |
| JP | 2005120382 A | * | 5/2005 | |
| JP | 2007-191710 A | | 8/2007 | |

OTHER PUBLICATIONS

Machine translation of CN 1582315 A, retrieved Jun. 2020 (Year: 2020).*
International Preliminary Report on Patentability with Translation of Written Opinion of the International Searching Authority dated Feb. 21, 2019 for PCT/JP2017/027847.
International Search Report for PCT/JP2017/027847 dated Oct. 17, 2017 [PCT/ISA/210].

* cited by examiner

*Primary Examiner* — Nicole M. Buie-Hatcher
(74) *Attorney, Agent, or Firm* — Sughrue Mion, PLLC

(57) ABSTRACT

Provided is a method for producing a chloroprene graft copolymer latex containing no organic solvent and exhibiting high adhesive strength even for soft polyvinyl chloride. A method for producing a chloroprene graft copolymer latex includes a chloroprene polymerization step of giving a chloroprene polymer latex and a graft copolymerization step of giving a chloroprene graft copolymer latex. The chloroprene polymerization step is a step of subjecting at least chloroprene (A-1) of chloroprene (A-1) and a monomer (A-2) copolymerizable with chloroprene (A-1) to emulsion radical polymerization. The graft copolymerization step is a step of adding, to the chloroprene polymer latex, a (meth) acrylate (B) and an organic peroxide (C) having an octanol/water partition coefficient of −2.0 or more and 3.0 or less to subject the chloroprene polymer to graft copolymerization with the (meth)acrylate (B) at a temperature of 10° C. or more and 40° C. or less.

8 Claims, No Drawings

US 11,028,212 B2

CHLOROPRENE GRAFT COPOLYMER LATEX, METHOD FOR PRODUCING SAME, BONDING AGENT AND ADHESIVE

CROSS REFERENCE TO RELATED APPLICATIONS

This application is a National Stage of International Application No. PCT/JP2017/027847, filed on Aug. 1, 2017, which claims priority from Japanese Patent Application No. 2016-157627, filed on Aug. 10, 2016.

TECHNICAL FIELD

The present invention relates to a chloroprene graft copolymer latex, a method for producing the latex, a bonding agent, and an adhesive.

BACKGROUND ART

Homopolymers of chloroprene and copolymers of chloroprene with other monomers (hereinafter also collectively called "chloroprene polymer") provide high adhesive strength under low pressure for various types of adherends and thus are suitably used in adhesives including organic solvent type contact adhesives and organic solvent type graft adhesives. To meet volatile organic chemical (VOC) controls or organic solvent controls in consideration of environmental pollution or human health, aqueous adhesives free from organic solvents have been developed, and aqueous adhesives containing a chloroprene polymer latex have been disclosed.

For example, PTL 1 discloses an aqueous adhesive containing a latex of a copolymer of a chloroprene, an α,β-unsaturated carboxylic acid, and 2,3-dichloro-1,3-butadiene. By copolymerization with the α,β-unsaturated carboxylic acid, the adhesive strength at high temperature (heat resistance) is improved. The aqueous adhesive disclosed in PTL 1, however, has lower adhesive strength than conventional organic solvent type adhesives containing a chloroprene polymer and organic solvent type adhesives containing a chloroprene graft copolymer. Hence, the aqueous adhesive is unlikely to provide high adhesive strength for soft polyvinyl chloride to which a chloroprene polymer is unlikely to adhere.

Such a copolymer of chloroprene with other monomers as disclosed in PTL 1 may provide higher adhesive strength than a homopolymer of chloroprene due to modification by copolymerization. However, chloroprene has low copolymerizability with other monomers and is copolymerizable with few monomers. The modification by copolymerization is thus limited. In addition, even when a copolymerizable monomer (for example, an α,β-unsaturated carboxylic acid) is used, a copolymer having a high copolymerization ratio is difficult to prepare due to low copolymerizability, and thus marked modification has been difficult.

As a method of modifying a chloroprene polymer, graft copolymerization with another monomer is known, and the graft copolymerization should improve the adhesive strength. For example, PTLs 2 to 5 disclose organic solvent type adhesives containing a chloroprene graft copolymer prepared by graft copolymerization of a chloroprene polymer with an alkyl methacrylate. However, each adhesive disclosed in PTLs 2 to 5 contains an organic solvent and thus are difficult to meet volatile organic chemical controls or organic solvent controls.

CITATION LIST

Patent Literature

PTL 1: JP 2007-191710 A
PTL 2: JP 01-284544 A
PTL 3: JP 01-123882 A
PTL 4: JP 02-286771 A
PTL 5: JP 2000-7833 A

SUMMARY OF INVENTION

Technical Problem

The present invention is thus intended to solve such problems in the related art as above and to provide a chloroprene graft copolymer latex containing no organic solvent and exhibiting high adhesive strength even for soft polyvinyl chloride, a method for producing the latex, a bonding agent, and an adhesive.

Solution to Problem

To solve the problems, aspects of the present invention are the following [1] to [10].

[1] A method for producing a chloroprene graft copolymer latex includes
a chloroprene polymerization step of subjecting at least chloroprene (A-1) of chloroprene (A-1) and a monomer (A-2) copolymerizable with chloroprene (A-1) to emulsion radical polymerization to give a chloroprene polymer, and yielding a chloroprene polymer latex in which particles of the chloroprene polymer are dispersed in water; and
a graft copolymerization step of adding, to the chloroprene polymer latex, a (meth)acrylate (B) represented by general formula: $CH_2=CR-CO-OR'$ (in the general formula, R is a methyl group or a hydrogen atom; and R' is an alkyl group having a carbon number of 4 or more and 12 or less), adding, as a polymerization initiator, an organic peroxide (C) having an octanol/water partition coefficient of −2.0 or more and 3.0 or less to subject the chloroprene polymer to graft copolymerization with the (meth)acrylate (B) at a temperature of 10° C. or more and 40° C. or less to give a chloroprene graft copolymer, and yielding a chloroprene graft copolymer latex in which particles of the chloroprene graft copolymer are dispersed in water.

[2] In the method for producing a chloroprene graft copolymer latex according to the aspect [1], in the graft copolymerization step, the (meth)acrylate (B) is added in an amount of 1 part by mass or more and 90 parts by mass or less relative to 100 parts by mass of the chloroprene polymer.

[3] In the method for producing a chloroprene graft copolymer latex according to the aspect [1] or [2], in the chloroprene graft copolymer latex, a tetrahydrofuran insoluble matter content is not less than 6% by mass and less than 70% by mass of the chloroprene graft copolymer.

[4] In the method for producing a chloroprene graft copolymer latex according to any one of the aspects [1] to [3], in the chloroprene polymerization step, at least one of an anionic emulsifier and a nonionic emulsifier is used to perform the emulsion radical polymerization.

[5] A chloroprene graft copolymer latex includes particles of a chloroprene graft copolymer, the particles are dispersed in water, and the chloroprene graft copolymer is a graft copolymer of a chloroprene polymer and a (meth)acrylate (B). In the chloroprene graft copolymer latex, the chloroprene polymer is a homopolymer of chloroprene (A-1) or a copolymer of a monomer (A-2) copolymerizable with chloroprene (A-1) and chloroprene (A-1), the (meth)acrylate (B) is a compound represented by general formula: $CH_2=CR-CO-OR'$, where R is a methyl group or a hydrogen atom, and R' is an alkyl group having a carbon number of 4 or more and 12 or less, and a grafting rate of the (meth)acrylate (B) to the chloroprene polymer is 0.5% or more and 90% or less.

[6] In the chloroprene graft copolymer latex according to the aspect [5], the chloroprene graft copolymer is a graft copolymer of 100 parts by mass of the chloroprene polymer and 1 part by mass or more and 90 parts by mass or less of the (meth)acrylate (B).

[7] In the chloroprene graft copolymer latex according to the aspect [5] or [6], a tetrahydrofuran insoluble matter content is not less than 6% by mass and less than 70% by mass of the chloroprene graft copolymer.

[8] The chloroprene graft copolymer latex according to any one of the aspects [5] to [7] further includes at least one of an anionic emulsifier and a nonionic emulsifier.

[9] A bonding agent includes the chloroprene graft copolymer latex according to any one of the aspects [5] to [8].

[10] An adhesive includes the chloroprene graft copolymer latex according to any one of the aspects [5] to [8].

Advantageous Effects of Invention

According to the present invention, a chloroprene graft copolymer latex containing no organic solvent and exhibiting high adhesive strength even for soft polyvinyl chloride, a method for producing the latex, a bonding agent, and an adhesive can be provided.

DESCRIPTION OF EMBODIMENTS

Conventional organic solvent type adhesives containing an organic solvent and a chloroprene graft copolymer are in a homogeneous system in which the chloroprene graft copolymer is homogeneously present in the organic solvent. In contrast, aqueous adhesives containing no organic solvent but containing water and a chloroprene graft copolymer are prepared by graft copolymerization through emulsion radical polymerization and are in an inhomogeneous system in which the chloroprene graft copolymer is inhomogeneously present in water.

Hence, in the graft copolymerization of a chloroprene polymer, graft-copolymerized portions of emulsified particles of the chloroprene polymer affect physical properties. On this account, also for the aqueous adhesives, aqueous graft copolymerization is required to be performed in emulsified particles so that graft polymers are evenly located on a chloroprene polymer as a backbone polymer as with the case of the organic solvent type adhesives. Specifically, aqueous graft copolymerization is required to be performed while radicals are homogeneously generated on the surface of and in emulsified particles.

The inventors of the present invention have conducted intensive studies, consequently have found that by graft copolymerization of a (meth)acrylate to a chloroprene polymer with a particular polymerization initiator in a particular temperature condition, radicals are homogeneously generated on the surface of and in emulsified particles to enable graft copolymerization in emulsified particles so that graft polymers are evenly located on the chloroprene polymer, and have completed the present invention.

In other words, a method for producing a chloroprene graft copolymer latex of the present invention includes a chloroprene polymerization step of giving a chloroprene polymer latex in which particles of a chloroprene polymer are dispersed in water and a graft copolymerization step of giving a chloroprene graft copolymer latex in which particles of a chloroprene graft copolymer are dispersed in water.

The chloroprene polymerization step is a step of subjecting at least chloroprene (A-1) of chloroprene (A-1) and a monomer (A-2) copolymerizable with chloroprene (A-1) to emulsion radical polymerization to give a chloroprene polymer, and yielding a chloroprene polymer latex.

The graft copolymerization step is a step of adding, to the chloroprene polymer latex, a (meth)acrylate (B) represented by general formula: $CH_2=CR-CO-OR'$, adding, as a polymerization initiator, an organic peroxide (C) having an octanol/water partition coefficient of −2.0 or more and 3.0 or less to subject the chloroprene polymer to graft copolymerization with the (meth)acrylate (B) at a temperature of 10° C. or more and 40° C. or less to give a chloroprene graft copolymer, and yielding a chloroprene graft copolymer latex. In the general formula, R is a methyl group or a hydrogen atom, and R' is an alkyl group having a carbon number of 4 or more and 12 or less.

The chloroprene graft copolymer latex of the present invention produced as above is a chloroprene graft copolymer latex in which particles of a chloroprene graft copolymer as a graft copolymer of a chloroprene polymer and a (meth)acrylate (B) are dispersed in water. The chloroprene polymer is a homopolymer of chloroprene (A-1) or a copolymer of a monomer (A-2) copolymerizable with chloroprene (A-1) and chloroprene (A-1). The grafting efficiency of the (meth)acrylate (B) to the chloroprene polymer is preferably 60% or more and 100% or less.

The chloroprene graft copolymer latex of the present invention contains no organic solvent and exhibits high adhesive strength even for soft polyvinyl chloride. In other words, even when at least one adherend of two adherends that are to adhere is made from soft polyvinyl chloride that is a material difficult to adhere, the chloroprene graft copolymer latex exhibits a high adhesive strength of, for example, 2.0 kN/m or more and enables adhesion of the two adherends. Hence, the chloroprene graft copolymer latex of the present invention can be used in a bonding agent or an adhesive. The adherend may have any shape, and the bonding agent or the adhesive of the present invention can be used for adhesion of foams, sheets, films, and the like. The soft polyvinyl chloride means a polyvinyl chloride softened by addition of a plasticizer.

A chloroprene graft copolymer latex pertaining to an embodiment of the present invention, a method for producing the latex, a bonding agent, and an adhesive will now be described in detail. The present embodiment is merely an example of the present invention, and the present invention is not limited to the embodiment. Various modifications or improvements may be made to the present embodiment, and such modifications or improvements may also be included in the present invention.

[1] Chloroprene (A-1)

Chloroprene that is a main material monomer of a chloroprene graft copolymer as a component of a chloroprene graft copolymer latex of the embodiment is a compound also called 2-chloro-1,3-butadiene or 2-chlorobutadiene.

[2] Monomer (A-2) Copolymerizable with Chloroprene (A-1), and Chloroprene Polymer A chloroprene polymer formed in a production process of a chloroprene graft copolymer latex in the embodiment (chloroprene polymerization step) is a polymer prepared by emulsion radical polymerization of at least chloroprene (A-1) of chloroprene (A-1) and a monomer (A-2) copolymerizable with chloroprene (A-1). In other words, the chloroprene polymer may be a homopolymer of chloroprene (A-1) or a copolymer of a monomer (A-2) copolymerizable with chloroprene (A-1) and chloroprene (A-1).

The monomer (A-2) may be any type that can be copolymerized with chloroprene (A-1), and examples include 2,3-dichloro-1,3-butadiene, 1-chloro-1,3-butadiene, butadiene, isoprene, styrene, methacrylic acid, acrylic acid, itaconic acid, 2-ethylmethacrylic acid, and 2-butylacrylic acid. These monomers (A-2) may be used singly or in combination of two or more of them. The copolymerization ratio between the chloroprene (A-1) and the monomer (A-2) is not limited to particular values.

[3] Chloroprene Polymer Latex

In a typical latex, a lipophilic substance is emulsified with an emulsifier and is dispersed as particles in water. In the chloroprene polymer latex in the embodiment, particles of a chloroprene polymer are dispersed in water, and the chloroprene polymer latex can be prepared by emulsion radical polymerization of at least chloroprene (A-1) of chloroprene (A-1) and a monomer (A-2) copolymerizable with chloroprene (A-1).

[4] Chloroprene Polymerization Step

The chloroprene polymerization step is, as described above, a step of subjecting at least chloroprene (A-1) of chloroprene (A-1) and a monomer (A-2) copolymerizable with chloroprene (A-1) to emulsion radical polymerization to give a chloroprene polymer, thus yielding a chloroprene polymer latex in which particles of the chloroprene polymer are dispersed in water.

In the chloroprene polymerization step, an emulsifier is used to perform aqueous emulsion radical polymerization. The emulsifier may be any type. However, the (meth)acrylate (B) added in the subsequent step has an ester structure capable of undergoing hydrolysis, and thus the pH of the reaction system is preferably not acidic or basic. Hence, an emulsifier having emulsification capacity even around neutral pH is preferably used.

Examples of the anionic emulsifier include alkali metal salts of disproportionated rosin acid, dodecylbenzenesulfonates (such as sodium dodecylbenzenesulfonate and triethanolamine dodecylbenzenesulfonate), diphenyl ether sulfonates (such as sodium diphenyl ether sulfonate and ammonium diphenyl ether sulfonate), naphthalenesulfonates (such as a sodium salt of β-naphthalenesulfonic acid-formaldehyde condensate), and fatty acid alkali metal salts (such as potassium laurate).

Examples of the nonionic emulsifier include partially saponified polyvinyl alcohol, polyoxyethylene nonylphenyl ether, polyoxyethylene octylphenyl ether, and polyoxyethylene lauryl ether.

These emulsifiers may be used singly or in combination of two or more of them.

In the chloroprene polymerization step, the polymerization temperature may be 10° C. or more and 50° C. or less and is more preferably 15° C. or more and 45° C. or less. At a polymerization temperature within the range, aggregates are unlikely to be formed, and a resulting chloroprene graft copolymer latex has sufficiently high adhesive strength. At a polymerization temperature within the range, polymerization rapidly proceeds, and thus the chloroprene polymer latex can be efficiency prepared.

The polymerization initiator usable in the chloroprene polymerization step is not limited to particular initiators, and common radical polymerization initiators can be used. Examples include organic or inorganic peroxides such as benzoyl peroxide, potassium persulfate, ammonium persulfate, cumene hydroperoxide, and t-butyl hydroperoxide and azo compounds such as azobisisobutyronitrile. These polymerization initiators may be used singly or in combination of two or more of them.

In the chloroprene polymerization step, a catalytic promoter may be used in combination with the polymerization initiator. In the chloroprene polymerization step, the usable catalytic promoter in combination with the polymerization initiator is not limited to particular catalytic promoters, and common catalytic promoters can be used. Examples include anthraquinonesulfonates, potassium sulfite, sodium disulfite, sodium sulfite, tetraethylenepentamine, and N,N-dimethyl-p-toluidine. These catalytic promoters may be used singly or in combination of two or more of them.

In the chloroprene polymerization step, the total conversion rate of each of chloroprene (A-1) and the monomer (A-2) copolymerizable with chloroprene may be 60% or more and 100% or less. When the conversion rate is within the range, the chloroprene polymer latex has a sufficient solid concentration, and possibilities of generating odors due to an unreacted chloroprene (A-1) or an unreacted monomer (A-2) or of reduction in bonding strength or adhesive strength of a chloroprene graft copolymer latex are eliminated. In addition, a possibility that an unreacted chloroprene (A-1) or an unreacted monomer (A-2) reacts in the subsequent graft copolymerization step to rapidly generate heat is eliminated. Moreover, a removal process of removing unreacted volatile components is not needed after the chloroprene polymerization step, or even when the removal process is performed, a lightly loaded treatment can be performed.

After the completion of the chloroprene polymerization step, a polymerization terminator may be added to stop the polymerization reaction when the reaction reaches a predetermined polymerization rate, in order to stop further polymerization reaction to give a chloroprene polymer having an intended molecular weight distribution. The polymerization terminator may be any type, and specific examples include phenothiazine, para-t-butylcatechol, hydroquinone, hydroquinone monomethyl ether, diethylhydroxylamine, and 4-hydroxy-2,2,6,6-tetramethylpiperidine-1-oxyl free radical. These polymerization terminators may be used singly or in combination of two or more of them.

[5] (Meth)acrylate (B)

The (meth)acrylate (B) is a compound represented by general formula: $CH_2=CR-CO-OR'$, has a reactive double bond in the molecule, and can undergo graft copolymerization with the chloroprene polymer. In the general formula, R is a methyl group or a hydrogen atom, and R' is an alkyl group having a carbon number of 4 or more and 12 or less. In the present description, "(meth)acrylate" means methacrylate and/or acrylate, and "(meth)acrylic" means methacrylic and/or acrylic.

When R' in the general formula is an alkyl group having a carbon number of 4 or more, the ester moiety in such a (meth)acrylate (B) is unlikely to be hydrolyzed. When R' in the general formula is an alkyl group having a carbon number of 12 or less, such a (meth)acrylate (B) has low viscosity and thus has an advantage in emulsification or mixing. R' in the general formula is preferably an alkyl group having a carbon number of 4 or more and 6 or less from the viewpoint of stability in graft polymerization.

Examples of the (meth)acrylate (B) include butyl acrylate, 2-ethylhexyl acrylate, lauryl acrylate, butyl methacrylate, isobutyl methacrylate, 2-ethylhexyl methacrylate, and lauryl methacrylate.

These (meth)acrylates (B) may be used singly or in combination of two or more of them.

[6] Chloroprene Graft Copolymer

A chloroprene graft copolymer formed in a production process of a chloroprene graft copolymer latex in the embodiment (graft copolymerization step) is a polymer prepared by graft copolymerization of the chloroprene polymer with a (meth)acrylate (B). Carbon-carbon double bonds of the chloroprene polymer are reacted with the carbon-carbon double bond of a (meth)acrylate (B) to cause graft copolymerization.

[7] Chloroprene Graft Copolymer Latex

In a chloroprene graft copolymer latex of the embodiment, particles of a chloroprene graft copolymer as a graft copolymer of the chloroprene polymer and a (meth)acrylate (B) are dispersed in water, and the chloroprene graft copolymer latex can be prepared by graft copolymerization of the chloroprene polymer with a (meth)acrylate (B).

The chloroprene graft copolymer latex may have a solid concentration of 35% by mass or more and 65% by mass or less, preferably 45% by mass or more and 65% by mass or less, and more preferably 53% by mass or more and 65% by mass or less. When the solid concentration is within the range, the drying time of a chloroprene graft copolymer latex can be shortened, and the load on a drying apparatus can be reduced. When the solid concentration is within the range, such a chloroprene graft copolymer latex can more easily maintain colloid stability, and aggregates can be prevented from generating at the minimum.

The solid concentration of a chloroprene polymer latex or a chloroprene graft copolymer latex can be determined by the following procedure, for example. A chloroprene polymer latex or a chloroprene graft copolymer latex is dried by heat treatment (for example, heating at 141° C. for 30 minutes) to give only solid contents, and the solid concentration is calculated from the mass before drying and the mass after drying.

The chloroprene graft copolymer latex may appropriately contain stabilizers such as an acid acceptor and an antioxidant to such an extent as not to impair the object of the present invention. The amount of the acid acceptor may be 0.01 parts by mass or more and 5 parts by mass or less and preferably 0.05 parts by mass or more and 1 part by mass or less relative to 100 parts by mass of the chloroprene graft copolymer. The amount of the antioxidant may be 0.1 parts by mass or more and 3 parts by mass or less and preferably 0.5 parts by mass or more and 2.5 parts by mass or less relative to 100 parts by mass of the chloroprene graft copolymer.

When the stabilizer is added within the range, an adhesive layer formed by drying such a chloroprene graft copolymer latex can have higher temporal stability in flexibility. When the amount of the acid acceptor is within the range, eliminated hydrochloric acid generated with time from the chloroprene graft copolymer is sufficiently neutralized, and excellent bonding strength or adhesive strength is achieved. In addition, the chloroprene graft copolymer latex has satisfactory colloid stability, and problems including sedimentation are unlikely to be caused. When the amount of the antioxidant is within the range, sufficient antioxidative effect is provided, and excellent bonding strength or adhesive strength is achieved.

When a stabilizer is insoluble in water or is a compound destabilizing the colloidal state of a chloroprene graft copolymer latex, the stabilizer may be previously dispersed in water to prepare a dispersion, and the dispersion may be added to a chloroprene graft copolymer latex.

The acid acceptor may be any type, and examples include zinc oxide and hydrotalcites (for example, trade name: DHT-4A, DHT-6 manufactured by Kyowa Chemical Industry Co., Ltd.). These acid acceptors may be used singly or in combination of two or more of them.

The antioxidant may be any type, and diphenylamine antioxidants such as octylated diphenylamine, p-(p-toluenesulfonylamide)diphenylamine, and 4,4'-bis($\alpha,\alpha$-dimethylbenzyl)diphenylamine are preferably used due to less stain resistance.

In order to improve ozone resistance, N,N'-diphenyl-p-phenylenediamine (DPPD) or N-isopropyl-N'-phenyl-p-phenylenediamine (IPPD) may be used. When discoloration of glueline or hygiene is problematic, a hindered phenol antioxidant is preferably used.

The chloroprene graft copolymer latex in the embodiment may appropriately contain, in addition to the above stabilizers (such as an acid acceptor and an antioxidant), a filler, a tackifier, a pigment, a coloring agent, a wetting agent, an antifoaming agent, a thickener, or the like, as needed, to such an extent as not to impair the object of the present invention.

The chloroprene graft copolymer latex may have a pH of 7.0 or more and 10.0 or less. The pH of the chloroprene graft copolymer latex may be adjusted within the range by using a base or the like. Examples of the base include amines such as diethanolamine and triethanolamine, metal hydroxides such as potassium hydroxide and sodium hydroxide or aqueous solutions of them, and amino acids such as glycine.

When the pH is within the range, the chloroprene graft copolymer latex is unlikely to cause aggregation. In addition, the chloroprene graft copolymer latex is unlikely to cause solidification by hydrolysis of an ester moiety. Depending on the type of an adherend for which the chloroprene graft copolymer latex is used, a chloroprene graft copolymer latex may cause hydrolysis (for example, hydrolysis of polyurethane) or corrosion (for example, dissolution of aluminum) to deteriorate an adherend. When the pH is within the range, such deterioration of an adherend is unlikely to be caused.

Such a chloroprene graft copolymer latex of the embodiment has high adhesive strength, exhibits a high adhesive strength of, for example, 2.0 kN/m or more even for soft polyvinyl chloride that is a material difficult to adhere, and enables adhesion. The measurement method of the adhesive strength will be specifically described in Examples.

[8] Graft Copolymerization Step

The graft copolymerization step is, as described above, a step of subjecting the chloroprene polymer to graft copolymerization with a (meth)acrylate (B) to give a chloroprene graft copolymer, thus yielding a chloroprene graft copolymer latex in which particles of the chloroprene graft copolymer are dispersed in water.

In the graft copolymerization step, to the chloroprene polymer latex prepared in the chloroprene polymerization step, a (meth)acrylate (B) and an organic peroxide (C) as a polymerization initiator are added, and the whole is reacted at a temperature of 10° C. or more and 40° C. or less. Accordingly, graft copolymerization of the chloroprene polymer with the (meth)acrylate (B) proceeds to yield a chloroprene graft copolymer latex.

The polymerization temperature is required to be 10° C. or more and 40° C. or less, as described above, and is more preferably 15° C. or more and 35° C. or less and even more preferably 15° C. or more and 30° C. or less. When the polymerization temperature is within the range, the grafting efficiency of the (meth)acrylate (B) to the chloroprene polymer is 60% or more and 100% or less, and when the conversion rate of the (meth)acrylate (B) is 90% or more and 100% or less, the grafting rate is consequently 0.5% or more and 90% or less, and the chloroprene graft copolymer latex has sufficiently high adhesive strength. When the polymerization temperature is within the range, the graft copolymerization rapidly proceeds, and thus the chloroprene graft copolymer latex can be efficiency produced.

In the graft copolymerization, an organic peroxide (C) having an octanol/water partition coefficient of −2.0 or more and 3.0 or less is used. When the octanol/water partition coefficient is within the range, a sufficient number of radicals are generated in emulsified particles (chloroprene polymer) of the chloroprene polymer latex, and thus radicals are homogeneously generated on the surface of and in emulsified particles. Hence, graft polymers are not unevenly located on the surface of or in the emulsified particles, and the graft copolymerization proceeds on the surface of and in the emulsified particles so that graft polymers are evenly located for the chloroprene polymer. As a result, the grafting efficiency of the (meth)acrylate (B) to the chloroprene polymer is 60% or more and 100% or less. In addition, when the conversion rate of the (meth)acrylate (B) is 90% or more and 100% or less, a chloroprene graft copolymer having a grafting rate of 0.5% or more and 90% or less can be consequently produced.

Examples of the organic peroxide (C) having an octanol/water partition coefficient of −2.0 or more and 3.0 or less include t-butyl hydroperoxide and cumene hydroperoxide. A liquid organic peroxide (C) may be added without treatment, and a solid liquid organic peroxide (C) may be added as a solution in the (meth)acrylate (B).

A catalytic promoter may be used, as needed, in combination with the polymerization initiator. The catalytic promoter may be any type that assists the function of the polymerization initiator, and specific examples include anthraquinonesulfonates, potassium sulfite, sodium disulfite, sodium sulfite, tetraethylenepentamine, and N,N-dimethyl-p-toluidine.

The octanol/water partition coefficient is also expressed as LogPow and is an index representing hydrophobicity (solubility in lipid) of a chemical substance. The measurement method of the octanol/water partition coefficient is basically in accordance with OECD Test Guideline ("C (81) 30 appendix 1" determined by OECD Board of Directors) 107 or Japanese Industrial Standards Z7260-107 (2000), "Determination of partition coefficient (1-octanol/water)-Shake flask method".

The grafting efficiency of a (meth)acrylate (B) to a chloroprene polymer can be determined, for example, by the following procedure. A chloroprene graft copolymer latex is added dropwise in methanol, and the resulting precipitate is collected by filtration. The collected precipitate is dried on a casting plate at 50° C. for 24 hours or more, and then the mass of the dried product is determined (regarded as "mass before extraction"). The dried product is finely cut with scissors or the like, and 4 g of finely cut pieces are subjected to Soxhlet extraction with a mixed solvent of methyl ethyl ketone and methanol (as for the mixing ratio, methyl ethyl ketone:methanol=2:1) for 48 hours. By Soxhlet extraction, homopolymers of a (meth)acrylate (B) and the like are extracted. The residue is dried at 50° C. for 24 hours, and then the mass of the dried product is determined (regarded as "mass after extraction").

From the change in mass before and after the Soxhlet extraction, the grafting efficiency is calculated in accordance with the following formula.

$$\text{Grafting efficiency } (\%) = 100 \times (X-Y)/X$$

In the formula, X is [mass before extraction (g)]×[amount of (meth)acrylate (B) in graft copolymerization step (g)]×[conversion rate of (meth)acrylate (B) in graft copolymerization step (o)]/([total amount of chloroprene (A-1) and monomer (A-2) in chloroprene polymerization step (g)]×[total conversion rate of chloroprene (A-1) and monomer (A-2) in chloroprene polymerization step (%)]+[amount of (meth)acrylate (B) in graft copolymerization step (g)]×[conversion rate of (meth)acrylate (B) in graft copolymerization step (%)]).

Y is [mass before extraction (g)]−[mass after extraction (g)].

The total conversion rate of chloroprene (A-1) and a monomer (A-2) copolymerizable with chloroprene in the chloroprene polymerization step or the conversion rate of a (meth)acrylate (B) in the graft copolymerization step can be determined by the following procedure, for example.

The solid concentration of a chloroprene polymer latex or a chloroprene graft copolymer latex is determined as described above, and the measured value of the solid concentration is regarded as S. Separately, the solid concentration (theoretical value) when the polymerization reaction proceeds 100% is theoretically calculated, and the theoretical value is regarded as $T_{100}$. The solid concentration (theoretical value) when the polymerization reaction proceeds 0% is theoretically calculated, and the theoretical value is regarded as $T_0$. The conversion rate (unit: %) is calculated in accordance with the following formula.

$$\text{Conversion rate} = (S-T_0)/(T_{100}-T_0) \times 100$$

In the graft copolymerization step, the amount of the (meth)acrylate (B) may be 1 part by mass or more and 90 parts by mass or less relative to 100 parts by mass of the chloroprene polymer. In such a condition, the graft copolymerization step yields a chloroprene graft copolymer as a graft copolymer of 100 parts by mass of the chloroprene polymer and 1 part by mass or more and 90 parts by mass or less of the (meth)acrylate (B).

When the amount of the (meth)acrylate (B) is within the range, the cohesive power of the chloroprene polymer is improved by graft copolymerization, and thus an adhesive layer formed by drying such a chloroprene graft copolymer latex has high strength and excellent contact adhesiveness. The amount of the (meth)acrylate (B) may be, as described above, 1 part by mass or more and 90 parts by mass or less relative to 100 parts by mass of the chloroprene polymer, preferably 10 parts by mass or more and 85 parts by mass or less, and more preferably 20 parts by mass or more and 55 parts by mass or less.

In the graft copolymerization step, the grafting rate of the (meth)acrylate (B) is defined as follows: [(grafting rate of meth)acrylate (B) (%)]=[amount of (meth)acrylate (B) relative to 100 parts by mass of chloroprene polymer (parts by mass)]×[conversion rate of (meth)acrylate (B)]×[grafting efficiency of (meth)acrylate (B)].

The grafting rate of the (meth)acrylate (B) is preferably 0.5% or more and 90% or less and more preferably 10% or more and 55% or less from the viewpoint of adhesiveness.

In the chloroprene graft copolymer latex, the tetrahydrofuran insoluble matter content may be not less than 6% by mass and less than 70% by mass of the chloroprene graft copolymer, more preferably not less than 15% by mass and less than 50% by mass, and even more preferably not less than 17% by mass and less than 45% by mass in order to maintain high adhesive strength. The tetrahydrofuran insoluble matter is a gel substance not dissolved in tetrahydrofuran and is a hard component having no elastic property.

When the tetrahydrofuran insoluble matter content is less than 70% by mass, an adhesive layer formed by drying such a chloroprene graft copolymer latex has excellent rubber characteristics including stretchability, flexibility, and elasticity. When the tetrahydrofuran insoluble matter content is not less than 10% by mass, an adhesive layer formed by drying such a chloroprene graft copolymer latex has excellent strength. Accordingly, such a chloroprene graft copolymer latex has excellent adhesive strength for soft polyvinyl chloride and can exhibit a high adhesive strength of, for example, 2.0 kN/m or more.

The tetrahydrofuran insoluble matter content can be determined by the following procedure, for example. First, 0.5 g of a chloroprene graft copolymer latex (containing 40% by mass or more and 65% by mass or less of water) is added dropwise to 100 mL of tetrahydrofuran. The mixture is then shaken overnight and is separated with a centrifuge separator to give a dissolved phase as a supernatant liquid. The obtained dissolved phase is heated at 100° C. to evaporate the tetrahydrofuran over 1 hour to give a dried product, and the mass of the dissolved content dissolved in the dissolved phase is determined. The mass of the dissolved content is subtracted from the mass of the chloroprene graft copolymer in the chloroprene graft copolymer latex to give the tetrahydrofuran insoluble matter.

The tetrahydrofuran insoluble matter content can be controlled by the type of an emulsifier, a chain transfer agent, a polymerization initiator, or a polymerization terminator used in the graft copolymerization step, the polymerization temperature in the graft copolymerization, the conversion rate of the (meth)acrylate (B), or the like. By appropriately setting such conditions, a chloroprene graft copolymer latex having an intended tetrahydrofuran insoluble matter content can be produced.

The chain transfer agent usable in the graft copolymerization step may be any agent, and a xanthogendisulfide or an alkyl mercaptan can be used. Specific examples of the xanthogendisulfide include diisopropyl xanthogendisulfide, diethyl xanthogendisulfide, dicyclohexyl xanthogendisulfide, dilauryl xanthogendisulfide, and dibenzyl xanthogendisulfide. Specific examples of the alkyl mercaptan include n-dodecyl mercaptan, n-decyl mercaptan, and octyl mercaptan. These chain transfer agents may be used singly or in combination of two or more of them.

In the graft copolymerization step, the conversion rate of the (meth)acrylate (B) may be 90% or more and 100% or less. When the conversion rate of the (meth)acrylate (B) is within the range, such a chloroprene graft copolymer latex has a sufficient solid concentration, and possibilities of generating odors due to an unreacted (meth)acrylate (B) or of reduction in bonding strength or adhesive strength of a chloroprene graft copolymer latex are eliminated. In addition, a removal process of removing unreacted volatile components is not needed after the graft copolymerization step, or even when the removal process is performed, a lightly loaded treatment can be performed.

Also in the graft copolymerization in the graft copolymerization step, aqueous emulsion radical polymerization can be performed with an emulsifier. The emulsifier may be any type, and similar anionic emulsifiers and nonionic emulsifiers to the emulsifier used in the chloroprene polymerization step can be used. Hence, the resulting chloroprene graft copolymer latex contains an emulsifier such as an anionic emulsifier and a nonionic emulsifier.

In the graft copolymerization step, the amount of the emulsifier is not limited to particular values and is preferably 1 part by mass or more and 10 parts by mass or less and more preferably 3 parts by mass or more and 8.5 parts by mass or less relative to 100 parts by mass of the (meth)acrylate (B). When the amount of the emulsifier is within the range, insufficient emulsification or viscosity increase is unlikely to be caused, and thus problems including poor control of polymerization heat generation, generation of aggregates, and poor appearance of a product are unlikely to be caused. When the amount of the emulsifier is within the range, the emulsifier is unlikely to be left, and thus problems including deterioration in water resistance of a chloroprene graft copolymer, reduction in bonding strength or adhesive strength, foaming during drying, and deterioration in color tone of a product are unlikely to be caused.

In the graft copolymerization step, the chloroprene polymer is subjected to graft copolymerization with the (meth)acrylate (B) to give a chloroprene graft copolymer, and the chloroprene polymer may be subjected to the graft copolymerization with an additional monomer copolymerizable with the (meth)acrylate (B), together with the (meth)acrylate (B). The amount of the additional monomer copolymerizable with the (meth)acrylate (B) is not limited to particular values and may be 0.1 parts by mass or more and 10 parts by mass or less relative to 100 parts by mass of the chloroprene polymer. When the amount of the additional monomer copolymerizable with the (meth)acrylate (B) is within the range, a resulting chloroprene graft copolymer latex has excellent bonding strength or adhesive strength.

The additional monomer may be any type that is copolymerizable with the (meth)acrylate (B), and examples include 1-chloro-1,3-butadiene, 2,3-dichloro-1,3-butadiene, butadiene, isoprene, styrene, acrylonitrile, vinyl acetate, acrylic acid, and methacrylic acid. These additional monomers may be used singly or in combination of two or more of them.

After the completion of the graft copolymerization step, a polymerization terminator may be added to stop the polymerization reaction when the reaction reaches a predetermined polymerization rate, in order to stop further polymerization reaction to give a chloroprene graft copolymer having an intended molecular weight distribution. The polymerization terminator may be any type, and a polymerization terminator similar to that used after the completion of the chloroprene polymerization step can be used.

The method for producing a chloroprene graft copolymer latex of the embodiment include, as described above, the chloroprene polymerization step and the graft copolymerization step, and may include an additional step other than these steps. For example, a removal step of removing unreacted volatile components may be included between the chloroprene polymerization step and the graft copolymerization step or after the graft copolymerization step. A cooling step, a polymerization reaction aging step, or a heating step may be included after and/or before at least one of the chloroprene polymerization step and the graft copolymerization step.

[9] Bonding Agent, Adhesive

The chloroprene graft copolymer latex of the embodiment produced as above can be used in a bonding agent or an adhesive. The chloroprene graft copolymer latex of the embodiment may be singly used without treatment as a bonding agent or an adhesive, or may be mixed with a tackifier to improve the adhesive strength and used as a bonding agent or an adhesive having high adhesive strength.

The tackifier may be any type, and phenol resins, terpene resins, rosin derivative resins, petroleum hydrocarbons, and the like can be used. Specific examples include a hydrogenated rosin, a pentaerythritol ester of a hydrogenated rosin, a polymerized rosin, a rosin-modified resin mainly containing rosin, an alkylphenol resin, a rosin-modified phenol resin, a terpene-modified phenol resin, and a natural terpene resin. These tackifiers may be used singly or in combination of two or more of them.

The amount of the tackifier may be 10 parts by mass or more and 60 parts by mass or less and preferably 20 parts by mass or more and 40 parts by mass or less relative to 100 parts by mass of the solid content in the chloroprene graft copolymer latex. When the amount of the tackifier is within the range, the tackiness is sufficiently achieved, and the adhesive strength can be sufficiently improved. The method of adding the tackifier may be any method, and an emulsion prepared by emulsifying and dispersing the tackifier may be added to the chloroprene graft copolymer latex.

By adding the tackifier to the chloroprene graft copolymer latex of the embodiment and appropriately adding an acid acceptor, an antioxidant, a filler, a pigment, a coloring agent, a wetting agent, an antifoaming agent, a thickener, or the like, as needed, a bonding agent or an adhesive can be produced.

The bonding agent or the adhesive containing the chloroprene graft copolymer latex of the embodiment has high adhesive strength, exhibits a high adhesive strength of, for example, 2.0 kN/m or more even for soft polyvinyl chloride, and enables adhesion.

EXAMPLES

The present invention will next be described in further detail with reference to examples and comparative examples.

Example 1

(1) Preparation of Chloroprene Polymer Latex

In a reactor having an internal volume of 5 L, 1,600 g of chloroprene, 69 g of disproportionated rosin, 1,367 g of pure water, 20 g of potassium hydroxide, and 0.57 g of n-dodecyl mercaptan (molecular weight modifier) were placed and emulsified.

To the emulsion, sodium sulfite was added, then potassium persulfate was added as a polymerization initiator, and polymerization was performed under a nitrogen atmosphere at 40° C. Immediately after the reaction reached an intended polymerization rate, a phenothiazine emulsion was added to stop the polymerization. The obtained reaction product had a solid concentration of 49% by mass, and the chloroprene conversion rate was 88%. Next, unreacted chloroprene was removed by steam stripping, and a chloroprene polymer latex was prepared. The measurement methods of the solid concentration and the conversion rate were the same as the methods described in "[7] Chloroprene graft copolymer latex" and "[8] Graft copolymerization step".

(2) Preparation of Chloroprene Graft Copolymer Latex

In a reactor having an internal volume of 5 L, 200 g of the chloroprene polymer latex obtained in the above preparation (1), 22.0 g of butyl methacrylate, 0.22 g of tetraethylenepentamine, 17.6 g of pure water, 0.88 g of potassium laurate, and 28 mg of n-dodecyl mercaptan (molecular weight modifier) were placed and emulsified.

To the emulsion, cumene hydroperoxide (having an octanol/water partition coefficient of 2.16) was added as a polymerization initiator, and aqueous graft copolymerization was performed under a nitrogen atmosphere at 30° C. Immediately after the reaction reached an intended polymerization rate, an aqueous solution of 4-hydroxy-2,2,6,6-tetramethylpiperidine-1-oxyl free radicals was added to stop the polymerization, and a chloroprene graft copolymer latex was prepared. At this time, the butyl methacrylate conversion rate was 100%. The amounts of the compounds used in the preparation of the chloroprene graft copolymer latex and the polymerization temperature are shown in Table 1. In Table 1, the amount of a chloroprene polymer latex means the amount of the chloroprene polymer contained in the chloroprene polymer latex.

TABLE 1

|  |  |  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- | --- |
| Conditions of graft copolymerization step | Chloroprene polymer (parts by mass) |  | 100 | 100 | 100 | 100 | 100 | 100 | 100 | 100 |
|  | (Meth)acrylate monomer (parts by mass) | Butyl methacrylate | 20 | 40 | 40 | 60 | — | 40 | 40 | 20 |
|  |  | Methyl methacrylate | — | — | — | — | — | — | — | — |
|  |  | 2-Ethylhexyl methacrylate | — | — | — | — | 40 | — | — | — |
|  | Polymerizable monomer (parts by mass) | Methacrylic acid | — | — | — | — | — | — | — | — |
|  | Polymerization initiator (parts by mass) | Cumene hydroperoxide | 0.34 | 0.45 | 0.45 | 0.34 | 0.45 | — | 0.34 | 0.34 |
|  |  | t-Butyl hydroperoxide | — | — | — | — | — | 0.27 | — | — |
|  |  | Benzoyl peroxide | — | — | — | — | — | — | — | — |

TABLE 1-continued

| | | | | | | | | | |
|---|---|---|---|---|---|---|---|---|---|
| Molecular weight modifier (parts by mass) | n-Dodecyl mercaptan | 0.05 | — | — | — | — | — | — | 0.05 |
| Emulsifier (parts by mass) | Potassium laurate | 0.8 | 1.6 | 1.6 | 2.4 | 1.6 | 1.6 | 1.6 | 0.8 |
| Polymerization temperature (°C.) | | 30 | 30 | 25 | 30 | 30 | 30 | 30 | 40 |
| Conversion rate of (meth)acrylate monomer (%) | | 100 | 100 | 100 | 100 | 100 | 100 | 100 | 100 |
| Grafting efficiency (%) | | 95 | 91 | 96 | 88 | 90 | 93 | 91 | 63 |
| Grafting rate (%) | | 19 | 36 | 38 | 53 | 36 | 37 | 36 | 13 |
| Evaluation: Tetrahydrofuran insoluble matter (% by mass) | | 37.1 | 35.2 | 17.7 | 16.1 | 14.8 | 43.4 | 63.8 | 6.6 |
| Adhesive strength (kN/m) | | 2.5 | 2.3 | 2.8 | 2.1 | 2.1 | 2.4 | 2.0 | 2.1 |

| | | Ex. 9 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Conditions of graft copolymerization step | Chloroprene polymer (parts by mass) | 100 | 100 | 100 | 100 | 100 | 100 | — |
| | (Meth)acrylate monomer (parts by mass): Butyl methacrylate | 85 | — | 40 | 40 | — | — | — |
| | Methyl methacrylate | — | 40 | — | — | — | — | — |
| | 2-Ethylhexyl methacrylate | — | — | — | — | — | — | — |
| | Polymerizable monomer (parts by mass): Methacrylic acid | — | — | — | — | — | 20 | — |
| | Polymerization initiator (parts by mass): Cumene hydroperoxide | 0.34 | 0.34 | — | 0.34 | — | 0.34 | — |
| | t-Butyl hydroperoxide | — | — | — | — | — | — | — |
| | Benzoyl peroxide | — | — | 0.51 | — | — | — | — |
| | Molecular weight modifier (parts by mass): n-Dodecyl mercaptan | — | — | — | — | — | — | — |
| | Emulsifier (parts by mass): Potassium laurate | 3.4 | 0.8 | 1.6 | 1.6 | — | 0.8 | — |
| | Polymerization temperature (°C.) | 30 | 30 | 30 | 45 | — | 30 | — |
| | Conversion rate of (meth)acrylate monomer (%) | 100 | 80 | 100 | 100 | — | Unmeasurable | — |
| | Grafting efficiency (%) | 77 | Unmeasurable | 91 | 62 | — | Unmeasurable | — |
| | Grafting rate (%) | 65 | Unmeasurable | 36 | 25 | — | Unmeasurable | — |
| Evaluation | Tetrahydrofuran insoluble matter (% by mass) | 9.5 | Unmeasurable | 31.4 | 7.7 | 0 | Unmeasurable | — |
| | Adhesive strength (kN/m) | 2.0 | 0.3 | 1.9 | 1.9 | 1.8 | Unmeasurable | 1.2 |

Examples 2 to 9 and Comparative Examples 1 to 5

(1) Preparation of Chloroprene Polymer Latex

A similar operation to that in Example 1 was performed to prepare a chloroprene polymer latex.

(2) Preparation of Chloroprene Graft Copolymer Latex

A similar operation to that in Example 1 was performed except that the type and the amount of a (meth)acrylate monomer to be subjected to graft copolymerization to the chloroprene polymer, the type and the amount of a polymerization initiator, the amount of n-dodecyl mercaptan, the amount of an emulsifier, the conversion rate of a (meth)acrylate monomer, and the polymerization temperature were changed in accordance with Table 1, giving chloroprene graft copolymer latexes of Examples 2 to 9 and Comparative Examples 1 to 5. The octanol/water partition coefficient of each polymerization initiator is as follows: t-butyl hydroperoxide has an octanol/water partition coefficient of −1.3, whereas benzoyl peroxide has an octanol/water partition coefficient of 3.43.

[Evaluation of Chloroprene Graft Copolymer Latex]

The tetrahydrofuran insoluble matter contents, the grafting efficiencies, the grafting rates, and the adhesive strengths of the chloroprene graft copolymer latexes of Examples 1 to 9 and Comparative Examples 1 to 5 prepared as above were evaluated. The evaluation methods will be described below.

<Measurement Method of Tetrahydrofuran Insoluble Matter Content>

The measurement method of the tetrahydrofuran insoluble matter content is the same as the method described in "[8] Graft copolymerization step".

<Measurement Methods of Grafting Efficiency and Grafting Rate>

The measurement methods of the grafting efficiency and the grafting rate are the same as the methods described in "[8] Graft copolymerization step".

<Measurement Method of Adhesive Strength>

To each of the chloroprene graft copolymer latexes of Examples 1 to 9 and Comparative Examples 1 to 5, a terpene phenol tackifier (a tackifier manufactured by Arakawa Chemical Industries, Ltd., trade name: Tamanol E-100) and a thickener (a thickener manufactured by San Nopco Limited, trade name: SN Thickener 612) were added to prepare an adhesive. The terpene phenol tackifier was added in an amount of 30 parts by mass relative to 100 parts by mass of the chloroprene graft copolymer in a chloroprene graft copolymer latex. The thickener was added as a 15% by mass aqueous solution in an amount of 2 parts by mass relative to 100 parts by mass of the chloroprene graft copolymer.

In Comparative Example 6, an organic solvent type adhesive containing a chloroprene graft copolymer (trade name: Showa Denko Chloroprene WHV manufactured by Showa Denko K.K.) was used as is, without addition of other components.

Next, to a soft polyvinyl chloride film having a length of 25 mm, a width of 200 mm, and a thickness of 2 mm (trade name: Toughnyl Top D blue manufactured by Japan Wavelock Co., Ltd.), each adhesive of Examples 1 to 9 and Comparative Examples 1 to 6 was applied with a brush. The coating amount of each adhesive was 200 g/m². The coating was heated and dried at a temperature of 60° C. for 6 minutes. Two films were prepared as above, and the faces with the adhesive were bonded together and pressed with a hand roller. The bonded films were cured at a temperature of 23° C. and a relative humidity of 60% RH for 7 days, giving a test piece for adhesive strength test. The measurement of the adhesive strength (peel strength) was performed by T-peel test in accordance with JIS K6854-3.

The evaluation results of the tetrahydrofuran insoluble matter content, the grafting efficiency, the grafting rate, and the adhesive strength are shown in Table 1.

As apparent from Table 1, Examples 1 to 9 had higher adhesive strength than Comparative Examples 1 to 6. Satisfactory adhesiveness was observed in a tetrahydrofuran insoluble matter content range of 15% by mass or more and 50% by mass or less, and more satisfactory adhesiveness was observed in a tetrahydrofuran insoluble matter content range of 17% by mass or more and 45% by mass or less. A higher grafting efficiency was likely to result in a higher adhesive strength, and a high adhesive strength was observed at a graft copolymerization temperature of 30° C. or less.

In contrast, in Comparative Example 1 in which methyl methacrylate was used for graft copolymerization in place of butyl methacrylate, the ester moiety at a grafting portion was likely to be hydrolyzed, and thus hydrolysis easily proceeded. The chloroprene graft copolymer latex was consequently unstable, and the chloroprene graft copolymer latex was solidified during curing of the test piece (on day 3). In addition, the cohesive power of the (meth)acrylate polymer was lost due to the hydrolysis of the ester moiety to result in reduction in adhesive strength.

In Comparative Example 2 in which benzoyl peroxide having a octanol/water partition coefficient of more than 3.0 was used as the polymerization initiator, it was supposed that polymerization proceeded mainly inside emulsified particles due to high lipophilicity of the polymerization initiator, and graft polymers were unevenly located inside the emulsified particles. As a result, the adhesive strength was thought to be low.

Comparative Example 3 was an example in which the polymerization temperature in the graft copolymerization step was more than 40° C., and it was supposed that the grafting efficiency deteriorated due to the high polymerization temperature and a butyl methacrylate homopolymer prevented the adhesion.

Comparative Example 4 was an adhesive prepared by using a chloroprene polymer latex obtained in the chloroprene polymerization step and had a low adhesive strength due to lack of graft copolymerization.

In Comparative Example 5 in which methacrylic acid was used in place of the (meth)acrylate, a viscosity increase interfered with stable graft copolymerization.

In Comparative Example 6 in which an organic solvent type adhesive was used in place of an aqueous adhesive, the adhesive strength for soft polyvinyl chloride was lower than those of the chloroprene graft copolymer latexes of Examples 1 to 9.

The invention claimed is:

1. A method for producing a chloroprene graft copolymer latex, the method comprising:
a chloroprene polymerization step of subjecting monomer material consisting of (i) chloroprene (A-1) or (ii) chloroprene (A-1) and a monomer (A-2) copolymerizable with chloroprene (A-1) to emulsion radical polymerization to give a chloroprene polymer, and yielding a chloroprene polymer latex in which particles of the chloroprene polymer are dispersed in water; and
a graft copolymerization step of adding, to the chloroprene polymer latex, a (meth)acrylate (B) represented by general formula: $CH_2=CR-CO-OR'$ (in the general formula, R is a methyl group or a hydrogen atom; and R' is an alkyl group having a carbon number of 4 or more and 12 or less), adding, as a polymerization initiator, an organic peroxide (C) having an octanol/water partition coefficient of −2.0 or more and 3.0 or less to subject the chloroprene polymer to graft copolymerization with the (meth)acrylate (B) at a temperature of 10° C. or more and 40° C. or less to give a chloroprene graft copolymer, and yielding a chloroprene graft copolymer latex in which particles of the chloroprene graft copolymer are dispersed in water;
wherein the chloroprene polymer latex contains no organic solvent, and
wherein the monomer (A-2) is selected from the group consisting of 2,3-dichloro-1,3-butadiene, 1-chloro-1,3-butadiene, butadiene, isoprene, styrene, methacrylic acid, acrylic acid, itaconic acid, 2-ethylmethacrylic acid and 2-butylacrylic acid.

2. The method for producing a chloroprene graft copolymer latex according to claim 1, wherein in the graft copolymerization step, the (meth)acrylate (B) is added in an amount of 1 part by mass or more and 90 parts by mass or less relative to 100 parts by mass of the chloroprene polymer.

3. The method for producing a chloroprene graft copolymer latex according to claim 2, wherein in the chloroprene graft copolymer latex, a tetrahydrofuran insoluble matter content is not less than 6% by mass and less than 70% by mass of the chloroprene graft copolymer.

4. The method for producing a chloroprene graft copolymer latex according to claim 2, wherein in the chloroprene polymerization step, at least one of an anionic emulsifier and a nonionic emulsifier is used to perform the emulsion radical polymerization.

5. The method for producing a chloroprene graft copolymer latex according to claim 1, wherein in the chloroprene graft copolymer latex, a tetrahydrofuran insoluble matter content is not less than 6% by mass and less than 70% by mass of the chloroprene graft copolymer.

6. The method for producing a chloroprene graft copolymer latex according to claim 5, wherein in the chloroprene polymerization step, at least one of an anionic emulsifier and a nonionic emulsifier is used to perform the emulsion radical polymerization.

7. The method for producing a chloroprene graft copolymer latex according to claim 1, wherein in the chloroprene polymerization step, at least one of an anionic emulsifier and a nonionic emulsifier is used to perform the emulsion radical polymerization.

8. The method for producing a chloroprene graft copolymer latex according to claim 1, wherein a polymerization terminator is added to stop the polymerization reaction after completion of the chloroprene polymerization step.

* * * * *